UNITED STATES PATENT OFFICE.

PAUL GASSEN, OF COLOGNE, PRUSSIA, GERMANY, ASSIGNOR TO HIMSELF AND JEAN HECKHAUSEN & WEIES, OF SAME PLACE.

METHOD OF PRESERVING COFFEE, &c.

SPECIFICATION forming part of Letters Patent No. 430,182, dated June 17, 1890.

Application filed November 11, 1889. Serial No. 329,940. (No specimens.)

*To all whom it may concern:*

Be it known that I, PAUL GASSEN, a subject of the King of Prussia, and a resident of the city of Cologne, in the county of Rhineland and Kingdom of Prussia, Germany, have invented certain new and useful Improvements in Preserving Coffee-Beans, Ground Coffee formed into lumps, &c., Coffee succedeants shaped in any form, Cocoa-Beans, as well as other articles of food which may be subjected to similar modes of preservation, of which the following is a specification.

The respective dry hard-shelled fruits or bodies are heated in a suitable apparatus, upon which is added a certain amount of rosin or shellac, with or without an addition of wax, (from about one-half to three per cent. of the weight of the material to be preserved.) With this rosin the fruits, &c., are mixed or rotated until all are covered with a uniform thin crust. In cases, however, where a more thorough incrustation is essential—for instance, in such fruits from the surface of which holes or crevices reach deep into the core of the fruit, &c.—the above proceeding is not sufficient, as the tenaciously-flowing rosin will not sufficiently enter into these small openings. For such cases I employ the following proceeding: The material to be preserved before being heated is dusted and mixed with very finely-powdered rosin or shellac, and then after the rosin has entered all crevices and holes it is heated. Coffee-beans, for instance, treated in this manner can even stand becoming wet through during their transport and being stored in a damp place for a prolonged period without losing much in quality. This is not approximately attained by any other mode of preservation in use. Moreover this preserving substance is, in the first place, a physiologically indifferent material, and, secondly, it is not soluble in hot water, and will consequently not enter into the infusion.

I am aware of the fact that others have sought to bring about apparently similar effects to those attained by my above-described proceedings, but in a manner altogether different from mine and not suitable for my purposes—so, for instance, by employing a watery gum solution (gum-arabic, gum-senegal, or gum-tragacanth,) or by the immersion of the objects to be preserved in rosin that has been made fluid by heat or dissolved by chemicals, (alcohol.)

The first mode cannot come into consideration, as a watery gum solution would be decomposed by water or dampness, and consequently not fulfill the purposes I aim at and attain—*i. e.*, of making the objects impermeable. The second mode—*i. e.*, by an immersion into hot fluid rosin—could by no means be employed for coffee-beans, cocoa-beans, and similar objects, as such objects immersed in rosin would, in becoming cold, at once stick together in almost inseparable lumps, and the crust of rosin produced in this manner would be much too strong to make the coffee-beans, &c., fit for regular consumption. The third mode—the covering with rosin dissolved in alcohol, ether, chloroform, &c.—cannot be employed for my purposes, as rosin dissolved in this manner has a decided flavor—*i. e.*, a very disagreeable flavor—which will not disappear with the volatilization of the solvent. In employing my above-described method, however, which is an easy and convenient one, the material to be preserved may be surrounded by a perfectly even air and water tight crust of any desired thickness, which is absolutely tasteless and inodorous, and which will fill up all holes and crevices and not cause the beans, &c., to stick together in lumps.

What I claim as my invention, and desire to secure by Letters Patent, is—

The above-described method of coating coffee, coffee surrogates in the shape of beans, grains, &c., and similar articles, which consists in heating the bodies which are to be preserved in a rotating cylinder, then introducing rosin, shellac, wax, or mixtures of these materials into this cylinder, that the rosin, &c., may be made fluid by the heat and intermixed with the bodies to be preserved, and surround them with a more or less strong coating of rosin adapted to prevent the air and dampness from entering into the interior of those bodies, then, after the rosin in the cylinder has become fluid and the bodies are surrounded with a uniform coating, withdrawing the cylinder from the fire, keeping it rotating for a time, and then removing the contents and allowing them to cool, as set forth.

In witness whereof I have hereunto set my hand this 26th day of October, A. D. 1889.

PAUL GASSEN.

Witnesses:
GUSTAVE ALBERT OELREDE,
WILLIAM D. WARNER.